Aug. 28, 1951  R. E. F. JOHANSON  2,565,502
SAW CHAIN
Filed Aug. 23, 1947  2 Sheets-Sheet 1
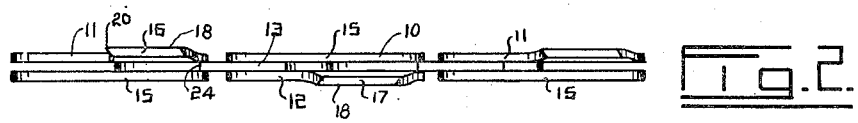
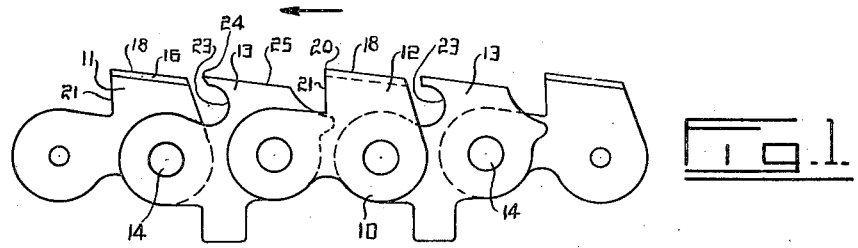
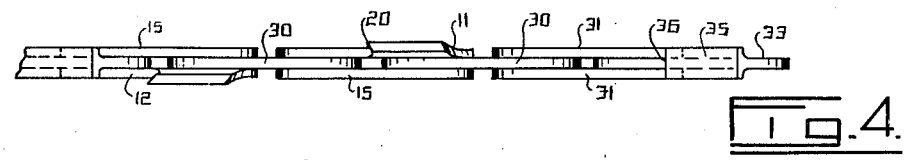
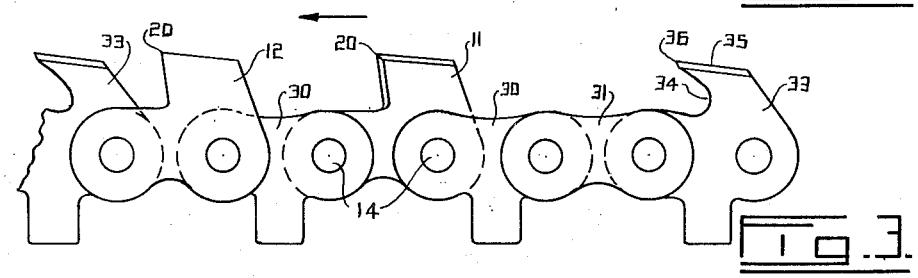
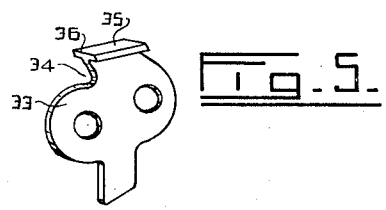
INVENTOR
ROBERT E. F. JOHANSON
BY
Fetherstonhaugh & Co.
ATTORNEYS Aug. 28, 1951   R. E. F. JOHANSON   2,565,502
SAW CHAIN Filed Aug. 23, 1947   2 Sheets-Sheet 2

INVENTOR
ROBERT E. F. JOHANSON
BY
Fetherstonhaugh & Co.
ATTORNEYS

Patented Aug. 28, 1951

2,565,502

UNITED STATES PATENT OFFICE 2,565,502

SAW CHAIN

Robert E. F. Johanson, Vancouver, British Columbia, Canada

Application August 23, 1947, Serial No. 770,216

2 Claims. (Cl. 143—135)

This invention relates to improvements in saw chains.

An object of the present invention is the provision of saw chains which may be run slower to get the same cutting results as the chains now commonly in use, thus reducing the amount of power required.

Another object is the provision of saw chains which will cut faster than the known chains.

A further object is the provision of saw chains with which there is less sawdust flying around to get into the eyes and lungs of the operators.

These saw chains are designed for chain saws and they are formed in endless belts which run around a cutter bar with pulleys at the opposite ends thereof, one of said pulleys being driven by a suitable source of power.

Figure 7:
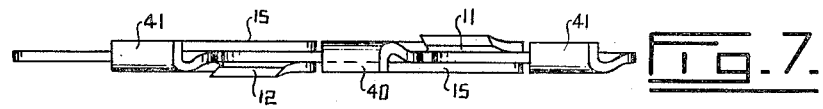
Figure 6:
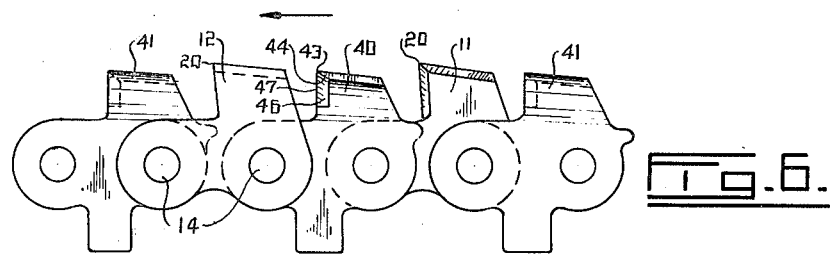
Figure 9:
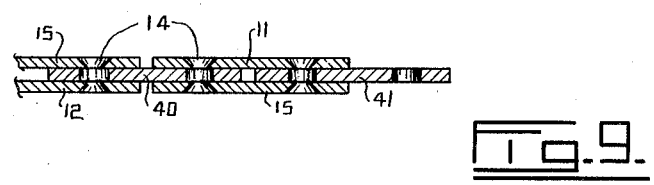
Figure 8:
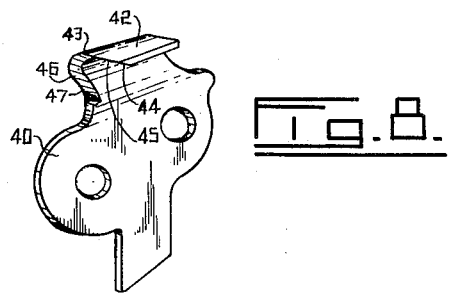

With the above and other objects in view, the present invention consists essentially of a saw chain comprising a plurality of right outside cutter teeth, left outside cutter teeth, and raker teeth pivotally connected together to form an endless chain, said raker teeth being a little shallower than the cutter teeth, as more fully described in the following specification and illustrated in the accompanying drawings, in which:

Figure 1 is a side elevation illustrating one form of the invention, with some of the side links of the chain removed, Figure 2 is a plan view of the chain shown in Figure 1, Figure 3 is a view similar to Figure 1 of an alternative form of the invention, Figure 4 is a plan view of the chain shown in Figure 3, Figure 5 is a perspective view of a raker tooth used in the chain of Figure 3, Figure 6 is a view similar to Figure 1 of another alternative form of chain, Figure 7 is a plan view of the chain shown in Figure 6, Figure 8 is a perspective view of a raker tooth used in the alternative of Figure 6, and Figure 9 is a horizontal section through any of these chains to show the method of connecting the links together.

Referring to Figures 1 and 2, 10 is a saw chain made up of right outside cutter teeth 11, left outside cutter teeth 12, and inner raker teeth 13, pivotally connected together by rivets 14 to form an endless chain. A connecting link 15 is located opposite each of the outside cutter teeth 11 and 12, see Figure 2. The rivets 14 extend through an outside cutter tooth, a raker tooth, and a connecting link, and are counter-sunk at each end, as clearly illustrated in Figure 9.

The outside cutter teeth are set to the right or left, depending upon whether they are right or left teeth, as shown in Figure 2. The teeth 11 and 12 are bevelled on the inside along their upper edges as at 16 and 17, respectively. These bevels form cutting edges 18 along the outer edge of each of these teeth which terminate at points 20, since the forward edges 21 of these teeth are under-cut slightly, and cutting edges 18 slope downwardly from said points 20.

Each raker tooth 13 has a deep under-cut 23 along its forward edge which forms a transverse cutting edge 24 along its upper forward corner, the upper edge 25 of said tooth tapering downwardly from said cutting edge. It will be noted that the cutting edge 24 lies in a plane slightly below the plane in which the points 20 of the side cutter teeth are located. In other words, each raker tooth is a little shallower than the cutter teeth.

In this chain, there is a raker tooth located between each pair of right and left outside cutter teeth. These teeth make two cuts which are spaced apart a distance a little greater than the thickness of the saw chain. The cutting edges 24 of the raker teeth scoop out the material between these cuts. The fact that these teeth do not cut quite as deeply as the cutter teeth, means that the latter are always running in grooves or cuts, thus making the chain cut easier than those in common use.

In Figures 3 and 4, the right and left outside cutter teeth 11 and 12 are the same as those described above. In this case, however, each left outside cutter tooth is connected by an inside connecting link 30 to the next following right outside cutter tooth 11. Another inside connecting link 30, which is connected to the right outside cutter tooth 11, is connected by a pair of outside connecting links 31 to an inner raker tooth 33, one of which is illustrated in Figure 5. It will be noted that a connecting link 15 is mounted opposite each outside cutter tooth. This sequence follows on from the raker tooth, that is, the next tooth is a left outside cutter 12. The raker tooth is under-cut as at 34 along its forward edge, and it extends laterally along its outer edge on both sides thereof to form a flat cutter 35 having a transverse bevelled cutting edge 36 at the forward end thereof. It is preferable that the cutting edge 36 lies in a plane slightly lower than the plane of points 20 of the outside cutter teeth.

With this arrangement, there are fewer cutting links in the saw chain so that less power is necessary to drive it. The flat cutter 35 with its cutting edge 36 cleanly cuts the material out from between the cuts made by the outside cutter teeth. The cutter 35 is wide enough to overlap the body of the chain. The rivets 14 of this chain are counter-sunk as described above.

In Figures 6 and 7, the left and right outside cutter teeth 12 and 11 are the same as above. Each left cutter tooth 12 is followed by a left inside raker tooth 40 which is connected to the following right cutter tooth 11. The latter is followed by a right inside raker tooth 41.

Figure 8 shows a left inside raker tooth 40. This tooth extends outwardly laterally along its outer edge on one side thereof, in this case, to the left, to form a flat cutter 42, the forward edge of which extends laterally from the leading corner 43 thereof, and is bevelled underneath as at 44. The right raker tooth is the same as this, with the exception that the cutter 42 extends laterally to the right. It will be noted that the leading corner 43 of each raker tooth is located below the plane in which the points 20 of the side cutter teeth are located. The sequence described is repeated after the right raker tooth 41, that is, a left outside cutter tooth follows.

As this chain operates, the cutters 42 of the right and left raker teeth 40 and 41 actually overlap each other and cut outwardly from approximately the centre of the saw chain. The forward edge 45 of each cutter 42 is in the form of a transverse cutting edge extending laterally from the leading corner 43. The forward edge of the tooth is bevelled as at 46 on its inner surface to form a vertical cutting edge 47.

The saw chains, according to this invention, reduce the friction, in the material to be cut, down to a minimum, and the outside cutter teeth make clean cuts so that the following raker teeth may quickly and easily remove the material between said cuts. This means that either less power may be used to operate the chain saw at a certain speed, or said chain saw may be operated at a higher speed with the same power. By operating the saw at a slower speed than is now commonly used, there is less sawdust being thrown from the cut, thus reducing the possibility of this sawdust getting into the eyes and lungs of the saw operators.

What I claim as my invention is:

1. A saw chain comprising a plurality of teeth pivotally connected together to form an endless chain, said teeth being arranged in sequences of a left outside cutter tooth, left inside raker tooth, right outside cutter tooth, and right inside raker tooth, each of said raker teeth extending outwardly laterally to form a flat cutter on one side thereof.

2. A saw chain comprising a plurality of teeth pivotally connected together to form an endless chain, said teeth being arranged in sequences of a left outside cutter tooth, left inside raker tooth, right outside cutter tooth, and right inside raker tooth, each of said raker teeth extending outwardly laterally to form a flat cutter on one side thereof, and the extensions of the right raker teeth extending to the right and those of the left rakers to the left.

ROBERT E. F. JOHANSON.

REFERENCES CITED

The following references are of record in the file of this patent:

UNITED STATES PATENTS

| Number | Name | Date |
| --- | --- | --- |
| 1,150,218 | Martin | Aug. 17, 1915 |
| 2,326,854 | Hassler | Aug. 17, 1943 |
| 2,327,233 | Wolf | Aug. 17, 1943 |
| 2,351,112 | Day | June 13, 1944 |
| 2,351,738 | Blum | June 20, 1944 |
| 2,387,064 | Forrest | Oct. 16, 1945 |

FOREIGN PATENTS

| Number | Country | Date |
| --- | --- | --- |
| 564,152 | Great Britain | Sept. 14, 1944 |